(12) United States Patent
Swann et al.

(10) Patent No.: US 10,116,141 B2
(45) Date of Patent: Oct. 30, 2018

(54) SYSTEM AND METHOD OF ENERGY RESOURCE DELIVERY

(71) Applicant: ROLLS-ROYCE PLC, London (GB)

(72) Inventors: Peter Swann, Nottingham (GB); Armin Stranjak, Erlagen (DE)

(73) Assignee: ROLLS-ROYCE plc, London (GB)

( * ) Notice: Subject to any disclaimer, the term of this patent is extended or adjusted under 35 U.S.C. 154(b) by 304 days.

(21) Appl. No.: 14/942,104

(22) Filed: Nov. 16, 2015

(65) Prior Publication Data

US 2016/0172865 A1 Jun. 16, 2016

(30) Foreign Application Priority Data

Dec. 11, 2014 (GB) .................................. 1421999.2

(51) Int. Cl.
*H02J 3/46* (2006.01)
*G05B 15/02* (2006.01)
(Continued)

(52) U.S. Cl.
CPC ............... *H02J 3/46* (2013.01); *G05B 15/02* (2013.01); *G06Q 50/06* (2013.01); *H02J 3/381* (2013.01)

(58) Field of Classification Search
CPC . H02J 3/46; H02J 3/381; G05B 15/02; G06Q 50/06
(Continued)

(56) References Cited

U.S. PATENT DOCUMENTS

| | | |
|---|---|---|
| 8,761,948 B1 | 6/2014 | Ippolito et al. |
| 2010/0191996 A1 | 7/2010 | Iino et al. |

(Continued)

FOREIGN PATENT DOCUMENTS

| | | |
|---|---|---|
| GB | 2514121 A | 11/2014 |
| GB | 2515888 A | 1/2015 |
| WO | 2014/035080 A1 | 3/2014 |
| WO | 2014/057304 A1 | 4/2014 |

OTHER PUBLICATIONS

Apr. 15, 2016 Search Report issued in European Patent Application No. 15194412.1.

(Continued)

*Primary Examiner* — Robert E Fennema
*Assistant Examiner* — Jigneshkumar C Patel
(74) *Attorney, Agent, or Firm* — Oliff PLC

(57) ABSTRACT

This invention concerns a method and apparatus for coordinating energy distribution over a local energy network having at least one generator and a plurality of systems requiring an energy supply for operation, each system in the local network being connected to the at least one generator and/or another system in the network for distribution of energy there-between. An agent for each respective one of the generator and systems has a data store, a data processor and a data transmitter and receiver for transmission and receipt of data communication with one or more of the other agents. The data processor of each agent is programmed to recognize a predetermined communication sequence having a plurality of ordered data communication steps required to initiate supply of energy between the generator or system of said agent and the generator or system associated with another agent. Each communication sequence is assigned a future time period for which the energy supply is to be enacted.

20 Claims, 8 Drawing Sheets

(51) Int. Cl.
*G06Q 50/06* (2012.01)
*H02J 3/38* (2006.01)

(58) Field of Classification Search
USPC .......................................................... 700/291
See application file for complete search history.

(56) References Cited

U.S. PATENT DOCUMENTS

2012/0143385 A1   6/2012  Goldsmith
2014/0249688 A1*  9/2014  Ansari ..................... H02J 3/46
                                                             700/297
2015/0127180 A1   5/2015  Oh et al.

OTHER PUBLICATIONS

Jun. 8, 2015 Search Report issued in British Patent Application No. 1421999.2.

* cited by examiner

| Message Type | Can Start Conversation ? | Ends Conversation ? | Expected Response | Alternative Response |
|---|---|---|---|---|
| Request Call for Proposal | Y | N | Call for Proposal | - |
| Call for Proposal | Y | N | Proposal | Refuse |
| Inform Generator Limits | Y | N | Proposal | Refuse |
| Proposal | N | N | Accept | Decline |
| Accept | N | N | Commit | Rollback |
| Commit | N | Y | - | - |
| Rollback | N | Y | - | - |
| Decline | N | Y | - | - |
| Refuse | N | Y | - | - |
| Notify | Y | Y | - | - |

SYSTEM AND METHOD OF ENERGY RESOURCE DELIVERY

BACKGROUND OF THE INVENTION

The present invention relates to systems for delivery of energy resources, and, more particularly, to systems for controlling the distribution of energy for example in the form of electricity and/or heat, such as within a local network or grid.

There exist a number of examples of local energy networks, or micro-grids, across which energy resources are to be distributed, such as: a plurality of connected or co-located commercial, industrial or domestic premises; different departments or functions within commercial or industrial premises; and, different systems aboard vehicles, such as aircraft, trains, ships, etc. Each of the different components of such local networks have individual energy/heating requirements, which can fluctuate over time.

In the case of different premises, each of the premises may individually draw all electrical power or gas from a mains supply. Similarly vehicles may be temporarily connected to external power supplies. In examples of local networks, which additionally or alternatively have local power generation facilities, there is a more complex problem of how best to distribute energy between the different components of the local network. A balance is generally required to be struck between satisfying all of the essential local network energy demands and achieving the best possible energy efficiency over the local network.

There are multiple problems encountered when attempting to determine an energy efficient time-varying distribution of electrical and heating load over a number of generators and boilers within a geographically limited area, including: satisfying local energy/heat demands; constraints introduced by the limited transportability of heat; the varying efficiencies of different types of generators as well as the varying efficiencies of each generator at different loading-levels; and, efficiency losses incurred by the need to draw energy from the wider electrical grid, potentially including the highly time-varying cost of electricity bought from or sold to the wider grid.

It is known within the art to perform a centralised calculation of the "optimum" distribution of heating and electrical generation load for some future time period, given a forecast of user demands during that same period. The centralised calculation is then followed by the issuing of instructions and the attempted implementation of the determined optimum distribution when the relevant time period arrives. This approach can be summarised as "calculate, then deploy" strategy, which has a number of drawbacks within the context of the resource allocation problem set out above. These drawbacks arise principally from a lack of continuous adaptability, and the need to recalculate an optimal distribution in its entirety when circumstances change.

In particular, real, current energy demands can differ from those assumed during the advance calculations. This could be due to imperfect forecasting or changes in requirements between the calculation and deployment. The consequences of this mean that adjustments to the determined solution will frequently be necessary in order to ensure that demand is met. Furthermore the resources available to satisfy energy demands typically change over time. Reasons for this may include boiler or generator breakdown, grid power cut, fuel delivery failure, planned or unplanned maintenance etc. This may require significant changes, at short notice, to be made to the determined solution.

An additional drawback of the prior art is the difficulty in achieving dynamic demand-side management in response to changing resource availability or price signals.

It is an aim of the present invention to provide an improved energy distribution system, which overcomes or at least partially mitigates one or more of the above problems. It may be considered an additional or alternative aim to provide an improved system for managing energy delivery over a local energy network or micro-grid.

BRIEF SUMMARY OF THE INVENTION

The invention exploits the opportunity for improved energy resource management presented by a micro-grid application, containing a relatively small number of energy consumers with the capability to coordinate their heat and electrical power demands in response to energy efficiency and/or price signals. The solution posed by the present invention allows ongoing assessment and reassessment of an energy delivery plan and a distributed (e.g. agent-based) approach for the energy distribution decision-making process, rather than the centralised "calculate, then deploy" approach.

According to a first aspect of the invention there is provided a method of energy distribution over a local energy network comprising at least one generator and a plurality of systems requiring an energy supply for operation, each system in the local network being connected to the at least one generator and/or another system in the network for distribution of energy there-between, the method comprising: providing an agent for each respective one of the generator and systems, the agent having a data store, a data processor and a data transmitter and receiver for transmission and receipt of data communication with one or more of the other agents, wherein the data processor of the agent is programmed to recognise a predetermined communication sequence comprising a plurality of ordered data communication steps required to initiate supply of energy to/from the generator and/or system associated with another agent, each communication sequence being assigned a future time period for which the energy supply is to be enacted.

Each system agent may monitor the energy consumption of its system and/or determine/predict an energy requirement of its system for a future time period. Each system agent may comprise one or more algorithm or module of machine readable code for determining said future energy requirement of its system.

Each system may comprise one or more sensors for measuring energy consumption by the system. The agent for each system may be arranged to receive readings from said one or more sensor of its associated system and/or another system in the network.

The predetermined communication sequence may be initiated by an energy demand or quota for a future time period. An energy demand may be communicated by a system agent to the generator agent or another agent in order to initiate a communication sequence therewith. The recipient system may initiate a further communication sequence with one or more further generator or system agent. The generator agent may initiate a communication sequence with one or more system agent by issuing an available or proposed energy quota for that system in respect of a future time period.

Initiation of a communication sequence with a first agent may trigger further communication sequences between the first agent and one or more further agents in the network. The further communication sequences may involve some or all the agents in the local energy network.

Any, any combination, or all, of the agent communication steps may be automated in response to a triggering, or subsequent, data communication within the sequence.

The, or each, communication sequence may comprise a data conversation.

A hierarchy of agents and/or conversations may be defined amongst the agents involved in communications pertaining to an initiating communication. The hierarchy may comprise a plurality of tiers. Completion of a communication sequence in one tier may require completion of a subordinate communication sequence in the, or each, lower tier in the hierarchy. Successful completion of a communication sequence with the initiating agent may require completion of at least one communication sequence in every level of the hierarchy.

The initiating agent may be designated the top of the hierarchy for the corresponding future time period and/or associated conversations within the local energy network.

A hierarchy of agents may be defined in which each agent is assigned to a tier in the hierarchy and wherein the plurality of data communication steps relate to communication with an agent in a different tier to its own tier.

Each communication between the agents in relation to the same time period may be assigned one of said plurality of data communication steps and stored in the agent data store. A conversation status of the, or each, communication sequence may be logged in the data store. A last received/transmitted one of said plurality of data communication steps in the sequence may define the conversation status.

The agent processor may be programmed upon receipt of a data communication relating to a time period to access the corresponding conversation status in the data store and determine if said received data communication represents a next communication in the predetermined communication sequence.

The present invention is particularly beneficial for use in controlling energy supply amongst a finite number of systems in a local network, since an agent according to the invention may be dynamically assigned to a system and/or tier in an energy supply chain, which may allow an energy supply network to function effectively without the need for a single central controller. That is to say each agent can communicate with one or more adjacent agent/tier according to the common protocol yet without direct knowledge of corresponding conversations at other tiers in the energy supply chain. This allows future energy requests and updates to be accommodated for the network as a whole by cooperation between the agents.

The energy delivered to the systems may comprise one or more of electrical, heat and/or chemical energy. The invention may accommodate a plurality of different forms of energy to be distributed within the local network. For example the generator may be an electrical generator but may also generate heat which can be distributed to one or more systems. In one embodiment the generator may be a system requiring delivery of chemical energy in the form of fuel for operation. Additionally or alternatively, one or more system may comprise a machine which consumes one form of energy, such as electricity, but may optionally generate one, or more, further form of energy, such as heat.

Each agent may maintain or output an energy schedule for the generator/system. The energy schedule may comprise the proposed energy input/output for the system/generator for a plurality of time periods. The energy schedule may be maintained in the agent data store. At each relevant time period, the agent may implement the predetermined energy usage or output. Alternatively, the agent may output the predetermined energy setting(s) for implementation by a system/generator controller.

The data store may comprise a plurality of data conversations, for example relating to different time periods and/or energy resource types. Each conversation record may comprise or contain a plurality of data communications between the respective agents. The conversations may be individually accessible by the data processor, for example by reference to a conversation identifier or the allotted future time period. It will be appreciated that a data conversation may comprise a plurality of data communications between a first agent and a plurality of other agents, or else a plurality of data communications between different agents.

Each agent may comprise its own data store, data processor and transmitter/receiver for transmission and receipt of data communication with one or more further agent. Alternatively a plurality of agents may reside on common computing equipment, for example wherein each agent is operated as an individual application on common hardware, and/or wherein each agent's data is stored separately from a further agent residing on the same hardware.

The predetermined communication sequence may comprise at least three or four ordered data communication steps. The sequence may or may not comprise/stipulate a direction of each communication between the communicating agents. For one or a plurality of communication steps in the sequence, the agent data processor may identify a positive or negative data communication, e.g. a reply, for the purpose of progressing to the next step of the sequence. Only one positive and one negative communication type for each said communication step may be identifiable to the agent data processor. This may help to define the protocol by which the agents can communication in a controlled manner, which may negate the need for a central controller.

The data processor may authorise or initiate supply of an energy resource between two systems of the network only upon determination of completion of the predetermined sequence of data communication steps. The data processor may decline or inhibit supply of an energy resource between the agents upon determination of a negative data communication or cessation of the data communication sequence prior to completion. A delay in response to a communication in the sequence may be determined by the agent as a negative response or cessation of the communication sequence. A delay threshold may be established for this purpose, for example to determine the length of time for which an agent awaits a response from the other agent to which a communication has been transmitted.

An agent may inhibit progress of a conversation to a next step of the data communication sequence in dependence upon a sequence block. A sequence block may comprise a blocking parameter, for example relating to a further conversation comprising one or more further agent in relation to a common demand or time period. Completion of the further conversation or a step of the predetermined sequence for the further conversation, may cause the agent to remove the block.

Each communication between agents in relation to the same energy demand and/or time period may be automatically assigned one of said plurality of data communication steps by a transmitting or receiving party of the communicating agents.

The energy generator may comprise an electrical energy generator or a heat generator (e.g. a boiler). The system may comprise an electrically-powered system or a heated system.

In any example, the system may comprise, or be, an asset, machine and/or heating system or a portion thereof.

The agent may be specific to one or more form of energy. A plurality of agents may be provided for each system or generator, wherein each agent for a common system/generator may transmit/receive communications in relation to different forms of energy.

One or more intermediate agent may be provided. The intermediate agent may communicate a demand or quota from a system/generator, or an agent thereof, to one or a plurality of other systems/generators, or agents thereof, in the local network. The intermediate agent may be an electricity agent.

Any agent, whether or not an intermediate agent, may administer/conduct, or otherwise be engaged in, a plurality of data conversations concurrently or in parallel.

One of the predetermined data communication steps may or may not comprise an energy proposal, for example comprising any, or any combination of: an energy demand/request, an offer of and/or a limit of energy generation or reduced consumption over the allotted time period. A proposal may comprise an energy profile over the predetermined future time period. A call or request for a proposal may comprise any of said energy proposal features.

One of the predetermined data communication steps may comprise an energy threshold or limit of a generator or system in the network.

According to a second aspect of the invention, there is provided a local energy network arranged to operate in accordance the method of the first aspect.

According to a further aspect of the invention, there is provided a data carrier comprising machine readable instructions for operation of an agent in accordance with the method of the first aspect.

Wherever practicable, any of the essential or preferable features defined in relation to any one aspect of the invention may be applied to any further aspect.

DETAILED DESCRIPTION OF THE INVENTION

Examples of the invention described below concern an energy scheduling or control system for optimising the generation and distribution of electricity and heat from a collection of generators and/or boilers within a local network. However the principles described herein-below may be applied to other energy supply scenarios, which may additionally or alternatively comprise delivery of fuel (e.g. gas or oil) as an energy resource, e.g. a chemical energy resource. Thus a local and or wider area fuel supply may be provided in a manner akin to the electricity generator and electrical grid connection described below. Such an external connection may allow the micro-grid to receive energy from the wider area supply and/or output energy to the wider area supply as necessary.

Figure 1:
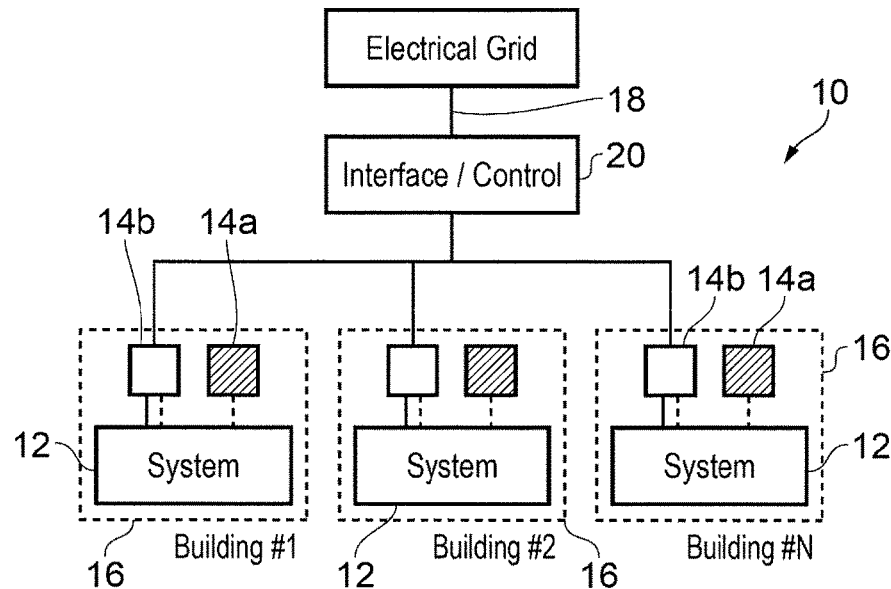
FIG. 1 shows a schematic layout of a local energy network according to an example of the invention.

Turning to FIG. 1, there is shown a local energy network 10, described below as a micro-grid. In this context, a micro-grid may be defined as a geographically localised region in which a number of interconnected energy-consuming systems 12 are provided, each of which have individual energy demands, across which energy demands can be balanced. The micro-grid 10 also has one or more local energy generators 14, which generate or convert energy from one form to another form to be consumed by the systems 12. In this example, the forms of energy under consideration are electricity and heat, such that the energy generators 14 comprise boilers 14a and electrical generators 14b. Any conventional form of generator may be accommodated, such as fuel powered generators or renewable energy powered generators.

Figure 2:
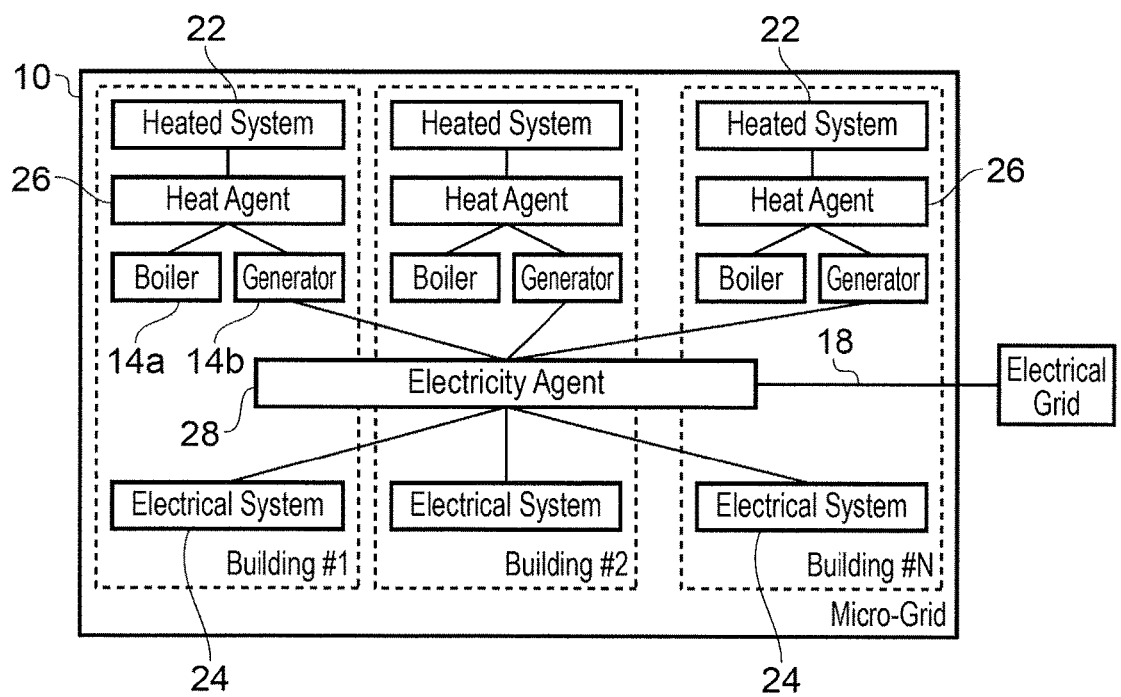
FIG. 2 shows data connections between the elements of the network of FIG. 1 for communication in accordance with an example of the invention.

In the example of FIGS. 1 and 2, each system 12 comprises its own boiler 14a and generator 14b. However, in other examples, one or more energy generator may be shared over the local network by a plurality of systems and need not be co-located with a particular system. Solid lines in FIG. 1 represent electrical energy lines, whereas dotted lines represent heat transfer by a suitable heat transfer medium, such as a conventional heat transfer fluid.

In the example of FIGS. 1 and 2, the individual systems 12 are separately housed and are identified as being separate premises or buildings 16. In this regard, the invention may be applied to a micro-grid 10 comprising a number of land-based premises/buildings or portions thereof, which can share energy demands, such as, for example an industrial estate, university campus, hospital, housing estate or shopping centre. However the approaches to managing energy distribution described herein could also be used to address total power provision in other applications such as aboard vessels, vehicles or aircraft in which the systems 12 represent sub-systems of the on-board energy network. For example, in ships, the output of a number of engines, generators, batteries, etc must be coordinated to satisfy mechanical, electrical and thermal demands of the ship's sub-systems at greatest efficiency and/or minimum cost. In aircraft, changes in the balance between electrical (e.g. avionics, lighting, passenger systems, etc), thermal (heating) and mechanical (propulsion) requirements must be accommodated, potentially over relatively short timescales. Thus, whilst the timescale over which the energy demands are balanced may change between different implementations of the invention, the same principles may be applied for co-ordination and re-balancing of energy demands up to the point of energy supply at an allotted time.

In view of the above various implementations of the invention, each energy-consuming system described herein may be referred to as an "energy consumer", in that it can be defined as a physical entity such as a building—or group of buildings which are related in some way (perhaps through ownership, physical proximity, power usage profiles or building type) and for which a collective determination or estimation of future energy demands can be made.

As well as electrical interconnections between the systems 12 (and/or premises 16), the local network 10 may have a temporary or permanent connection 18 to the wider electricity grid. The connection 18 may be common to the systems 12 in the micro-grid, e.g. such that the systems 12 may share a single grid connection 18. The grid connection 18 may be made via a dedicated power controller or interface unit 20 and may be used to import or export electricity from/to the micro-grid.

The term "boiler" used herein refers to a device whose sole purpose is the generation of heat (i.e. a heat generator). Whilst a boiler conventionally heats water/steam, it will be appreciated that other heat transfer media may be used.

The boiler may use fossil fuels to produce heat, but suitable boilers could include devices which produce hot water or steam through other means, including but not limited to: electrical/resistive heating devices; heat pumps; and/or renewable sources such as solar thermal, concentrated solar, or geothermal. In contrast to boilers, the systems 12 themselves may generate waste heat as a by-product of operation, which may form another source of distributable heat for the energy management system.

The term "generator" refers to a device which produces one form of energy (such as electricity), but may also produce waste heat. Examples of generators could include (but would not necessarily be limited to): a device which turns chemical energy directly into electrical energy (such as a fuel cell); a combination of 1) a device which turns chemical energy into mechanical energy (such as a gas turbine or reciprocating engine), and 2) a device which turns mechanical energy into electrical energy (more commonly known as an electrical generator); and/or a wind turbine, solar photovoltaic array or other renewable power generation device or devices which may or may not produce waste heat in addition to electricity.

Turning now to FIG. 2, there is shown an example of an energy agent communication system for use in managing the energy demands of the energy consuming and generating systems in the micro-grid 10. In this example, each energy consuming system 12 may comprise a thermal/heating system 22 and/or electrical system 24, either or both of which may be a subsystem of the energy consuming system 12. The electrical system 24 may comprise a plurality of connected electrical or electronic devices/machines which need to draw electrical power in order to function. The heating system 22 may for example comprise thermally connected heat exchange devices or radiators connected by suitable heat transfer means, such as plumbing/ducting for a heat exchange fluid.

In this example, it can be seen that each system comprises a dedicated agent 26, 28 for communication directly or indirectly with other agents in the micro-grid 10 so as to co-ordinate energy demands for a period of micro-grid operation. The format/structure of the communications between agents is controlled in a manner that will be described in further detail below. The agents 26 in this example comprise heat agents. Each agent may be specific to a form of energy.

In this example, an intermediate or common agent 28 is provided for co-ordination of electrical energy demands of the micro-grid 10. Thus it will be appreciated that central control of one form of energy may be provided but which may communicate with agents in respect of other forms of energy as part of a distributed (rather than entirely centralised) energy management scheme. In other examples, each system may have a distinct and separate electrical energy agent, which may communicate with other electrical energy agents in the network.

Furthermore, for the avoidance of doubt, even in an example in which a common, or intermediate, agent is provided for one form of energy, that agent may comprise a plurality of models or elements which represent the different energy requirements of the individual systems 12. Thus the common agent may comprise a plurality of interoperating sub-agents which act for individual systems.

Figures 3, 4:
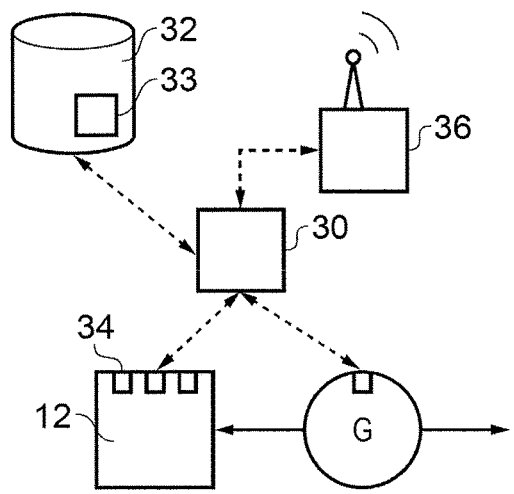
FIG. 3 shows an example of an agent according to an example of the invention.
FIG. 4 shows a table of the predetermined data communications recognised by agents according to an example of the invention.

With respect to FIGS. 1-3, each agent 14a, 14b, 22, 24, 26, 28 comprises a data processor 30 in communication with a data store 32 so as to be able to read/write data from/to the data store 32 and process said data in accordance with the invention. Collectively the data processor and data store manage a model of the associated energy system 12, i.e. the heat system or electricity system, such that the agent can act for and in respect of the system 12 in communicating future energy demands of the system in a manner to be described below. In this respect it will be appreciated in this example that the heat 22 and electrical systems 24 are modelled as separate systems, each having a respective agent such that one energy system 12 may be accommodated by a plurality of agents for the plurality of different energy types making up each system 12.

The model is schematically indicated at 33 and may comprise a combination of one or more algorithm for determining future energy demands of the system as well as corresponding energy availability and/or system operation data. The system comprises one or more sensor 34, typically a number of sensors 34, for determining one or more operational variable of the system 12. The variables may comprise a system setting and/or one or more operational parameter used to monitor/regulate the operational level/rate of the system. Such parameters will vary depending on the type of system being accommodated but may comprise, for example, any or any combination of temperature, flow rate, operational forces (such as torque, pressure, thrust or the like), and/or mechanical movements.

The sensor signals may contribute to the system model 33 maintained by the agent. Sensor reading(s) are communicated to the processor 30 and/or data store 32 such that they can be processed and/or stored to the system model data.

As with the systems themselves, each generator 14b and boiler 14a may have an agent associated therewith and will typically have one or more sensors for monitoring operation thereof. Such sensor signals will typically be fed to the electrical/heat agent as necessary during operation of the system and may contribute to a model for the electrical/heat agent.

The model 33 for each system comprises a plurality of energy profiles for predetermined time periods, detailing the energy to be delivered and consumed by operation of the system over said time period. The combined time periods and associated energy profiles thus comprise a plan/schedule of energy consumption by the system. The model also comprises the ideal or desirable energy profile for each time period as well as threshold values of permissible energy settings (e.g. maximum and minimum values). Such threshold values may be set according to safety requirements or other operational considerations. In one example, the model may comprise standard energy requirements/profiles for the system. For example, the model may have a predetermined schedule of energy demands of the system based on standard or routine operation. In the example of the electrical and/or heat requirements of premises, those requirements may be cyclic, for example based on daily, weekly, monthly and/or seasonal energy demands. In the case of aircraft/ships, the demands of each subsystem may be dependent on a standard phase/period of a journey and may be cyclic in respect of repeated journeys at subsequent time periods. In any example, the invention allows modification of the standard energy requirement profiles in accordance with the energy requirements of other systems in the micro-grid.

Similar models are also maintained for the generators 14*b* and/or boilers 14*a* within the micro-grid. Those models may comprise a standard energy generation profile for normal operation over a given time period, which may be modified using the invention described herein. The models may also define maximum and/or minimum energy capability/generation thresholds.

The processor 30 has associated transmitter/receiver circuitry 36 for enabling data communications with other agents in the micro-grid. Any conventional wired/wireless data communication protocols may be used for the invention and may include secure/encrypted communication protocols.

It will be appreciated that 'agents' as referred to herein may be specific to either or both of an energy type and/or a specific system/generator. Thus, in different examples of the invention, one agent may manage all different energy types (e.g. electrical and heat) for a specific system. Alternatively an agent may manage just one energy type for one, a plurality, or all systems. A combination of such different varieties of agents may be used in the micro-grid as shown in the example of FIG. 2.

The processor 30 of each agent is programmed by machine readable instructions, e.g. one or more module of executable code, to transmit and receive data communications with other agents in the micro-grid according to a predetermined protocol for the purpose of automatically arranging/negotiating changes to the energy profile for future time periods of operation. The protocol of the communications allows agreeable changes to permeate through the micro-grid by positive or negative responses (e.g. acceptance or refusal) to received communications by each affected agent in sequence.

In order to agree, and schedule or implement, an energy profile (or a change to an existing energy profile) for a future time period, at least one communication sequence between agents must be completed by a series of positive responses. A negative response ends the communication sequence without scheduling the proposed energy profile in respect of the future time period under that specific communication sequence. It is important to note that an agent could commence a plurality of communications with different agents in respect of alternative proposals/supplies for a common future time period. Thus only one of those communication sequences could be ultimately agreed and implemented, with the others being rejected. Furthermore a negative response from one or all agents may result in a following communication sequence being commenced in respect of a different proposal (e.g. a re-negotiation).

Each agent is programmed to acknowledge positive and negative communications according to a specific data format such that incorrectly formatted or general communications from other agents/parties, or indeed a communication from an incorrect agent, will not advance the communication sequence positively or negatively.

The table below shows an example of the communication protocol proposed by the invention for data communications between the agents within the micro-grid.

| Call for Proposal | |
|---|---|
| Propose | Refuse |
| Accept | Reject |
| Commit | Rollback |

Items in the right hand column are alternatives to the corresponding items in the left hand column. If no response is received from a conversant within a predetermined amount of time, then the appropriate item from the right-hand column is deemed to have been received and the conversation is therefore deemed to have ended. The ordering of message-types in the left hand column dictates the ordering of the conversation. Therefore, if an agent receives a message whose type is given in the left-hand column of a specific row (excluding the bottom row) in the table, that agent must reply with a message type given in either column of the next row.

In this protocol, a data conversation between agents can only be initiated by a specific type of communication, namely a 'Call for Proposal' communication in this example. An initiating message may contain a specific data format or identifier so that it can be identified by another agent as a conversation initiator. The initiating communication will typically comprise/define the time period for which an energy profile or profile change is to be established. That time period may be defined by start and end times and/or dates. The time period may be used as the conversation identifier or a portion thereof and may be present in all subsequent data communications relating to the same conversation. Additionally or alternatively the transmitting and/or receiving agent may be specified in the data communication, e.g. by an identifier and/or network address. Additionally or alternatively, a serial number derived from the time and date at which the initiating message is created may be employed to ensure uniqueness of the conversation identifier.

The recipient agent can respond with a 'Proposal' message, for example comprising a proposed energy profile for the specified time period. Alternatively the recipient agent can send a 'Refuse' message which ends the data communication sequence, without scheduling a new energy profile for the specified time period.

Upon receipt of the 'Proposal' response, the initiating agent can either accept or reject the proposal. A 'Reject' message will terminate the conversation, whereas the accept message will progress the conversation to the next stage, where the initiating agent awaits a final commitment message from the receiving agent before scheduling the energy profile for the scheduled time period.

A proposed energy profile for a specified time period is only binding once a 'Commit' message has been sent by the agent that received the initiating communication. This means that each proposal can explore the full range of available options, mindful that a certain subset of those options may have disappeared by the time one of the full set is accepted. In cases where the desired option is no longer available, the participant will issue a 'Rollback' message in place of the 'Commit' message, and the conversation between the agents can recommence. Otherwise receipt of the 'Commit' by the initiating agent will positively terminate the conversation.

A positive end to a conversation results in the agreed energy profile (i.e. a profile of the energy supply/consumption) over the specified time period being stored in the agents data store 32 and then deployed when the specified time period is reached. A newly agreed energy profile resulting from successful completion of the data conversation will be used to amend any previously stored energy profile for the corresponding time period, for example by adding to, subtracting from, or overwriting the existing energy profile to create a new profile. This allows changes to energy scheduling to be made in a distributed and automated fashion right up to the point of deployment. Thus the system can accommodate any or any combination of: unforeseen circumstances, performance degradation of one or more system or generator; and/or changes to improve energy distribution efficiency. All such changes can be orchestrated in a similar, automated fashion using the framework of the invention.

Another example of a structured data conversation format, which represents a development of the above example is provided in FIG. 4. The example of FIG. 4 is similar to the predetermined sequence of data communications described above and like features will not be described again. However this example, a conversation can be initiated by a number of different communications types, namely a 'Request Call for Proposal', a 'Call for Proposal' or an 'Inform Generator Limits' communication. This allows different types of agent to initiate a data conversation. The 'Inform Generator Limits' communication will, for a specific time period, typically define the minimum heat generation profile that a generator of electrical energy must produce as by-product if the heat energy requirements of the corresponding heated system 22 are to be met for the specific time period, given the availability and/or heat-generation capacity of any co-located boiler or boilers. The 'Inform Generator Limits' communication will, for the same specific time period, also typically define a maximum heat-generation profile that a heated system may be prepared to acquire from the electrical energy generator. If the electrical energy generator subsequently chooses to generate electrical energy at a rate that produces heat by-product at a rate exceeding the maximum level specified in the 'Inform Generator Limits' communication, then the portion of heat production which exceeds the maximum level will be wasted due to being over and above the requirements of the heated system.

Thus whilst a minimum limit will typically be a 'hard' limit, the maximum limit may be a 'soft' or preferred/optimal, rather than essential, limit.

The above described system for synchronisation of multi-party energy demands depends on a number of factors. When an agent issues a message or messages to one or more receiving agents, it must be able to process associated data to:

a) Log recipient numbers and IDs (i.e. so as to know how many replies to wait for, and from whom, before combining them to produce subsequent action or outgoing messages). Thus replies will be stored until the total number of expected replies are received prior to progressing the data conversation b) Log for each expected reply what the expected message type is c) Log a transmission time for outgoing messages and determine a time delay (i.e. a period of time to wait for replies before assuming no reply was sent)

d) Determine and log what its next task is e) Collate/log any received replies to the corresponding outgoing message f) Identify when to start the next task g) Identify all the conversations containing information relevant to the next task h) Identify whether or not an outgoing message represents the end of the conversation.

In examples of the invention, when an agent receives a message, it must be able to process associated data so as to:

i) Determine whether the received message is expected from a sender j) Identify the associated conversation and how to progress the conversation (e.g. according to a positive or negative response), and how (or indeed if) it relates to other conversations already active k) Identify whether the received message ends the conversation l) Identify whether or not the received message type initiates a new conversation m) Collate/log incoming messages relating to the same conversation n) Determine if a received message represents the last required communication for progression of one or more other conversations In achieving the above-described aims of the invention, it will be appreciated that each agent typically stores a specific data set for each conversation, including not only a conversation identifier but also a conversation status. The conversation status allows an agent to identify what action is awaited or to be performed to move the conversation forward. In addition, each agent may additionally store for each conversation any, or any combination of: one or more agent ID involved in the conversation; time of last transmitted/received communication; time delay until deemed negative response; identifiers of linked conversations, the outcome/status of which will impact the current conversation.

The stored conversation status may additionally or alternatively comprise one or more conversation blocking parameter in order to allow synchronisation of a plurality of related conversations for a common future time period. A blocking parameter may comprise an identifier of an awaited communication in another conversation (i.e. a parallel or corresponding conversation) with regards to a common future time period. The blocking parameter inhibits further progress of a conversation (i.e. transmission of the next communication in the conversation sequence) by an agent until an awaited communication on the related conversation is received. Once the awaited communication is received, the block can be lifted in order to allow previously blocked conversation to proceed. This blocking parameter is thus crucial in allowing synchronisation of multiple conversations to ensure the optimal energy supply is achieved. It can also avoid the problems associated with agreeing an energy profile due to an acceptable response from one agent, whilst a communication from one or more further agent is delayed, which energy profile may subsequently require renegotiation once all relevant communications from different agents have been received.

Turning now to FIGS. 5 to 9, there is shown a series of examples of use of agents according to examples of the invention to automate energy scheduling for a plurality of scenarios, using the conversation structure/protocol of FIG. 4. In each example, it can be seen that an initiating communication commences a conversation between a plurality of entities in the local energy network, wherein each entity may be an electrical system, a heat system, an electrical generator, a heat generator, an electricity agent or a heat agent. In order to progress that conversation, the entity may initiate or continue another conversation with another entity in the local energy network. This process may be repeated until some, or all, of the entities in the network are a party in a related conversation. Thus a hierarchy of conversations can be defined as a plurality of tiers, in which a conversation in a higher tier is dependent on a communication of a related conversation in a lower tier. Thus a conversation in each tier must be successfully completed in order to complete the initiating conversation, i.e. the highest tier conversation.

Figure 5:
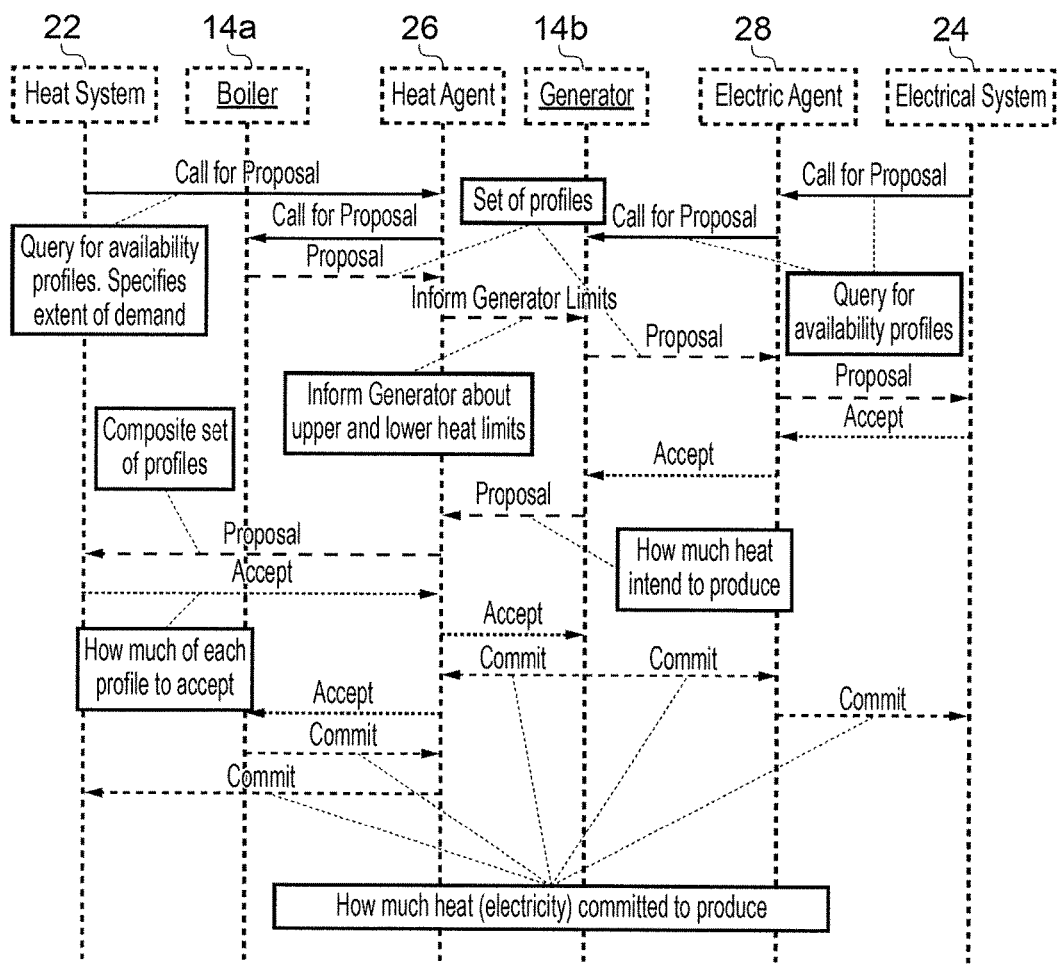
FIG. 5 shows an example scenario of use of the invention to determine acceptable power and heat generation and distribution for a predetermined time period.

In FIG. 5 a straightforward scenario of scheduling normal or 'baseline' heat and electricity distribution in respect of a future time period for one heating system, one electrical system, one electrical generator and one boiler in a micro-grid is shown. Each of the electrical and heat systems (i.e. energy consuming systems) initiate the process by transmitting a Call for Proposal message to respective agents. The agents then transmit a corresponding Call for Proposal message to respective electrical and heat generators, thereby starting a second tier of conversations. The heat agent informs the electrical generator about upper and lower heat limits so as to initiate a third tier of conversation. Once in receipt of maximum and/or minimum heat production limits, i.e. of which at least the minimum threshold is limiting on the operational range of the electrical generator, the generator can thus transmit the requested electricity proposal to the electrical agent and each of the open conversations in each tier can be concluded by a sequence of Proposal, Acceptance and Commit messages in the order heading downwards as shown in FIG. 5 until each initial message recipient has sent Commit message to the initiating entity in its conversation tier.

Figure 6:
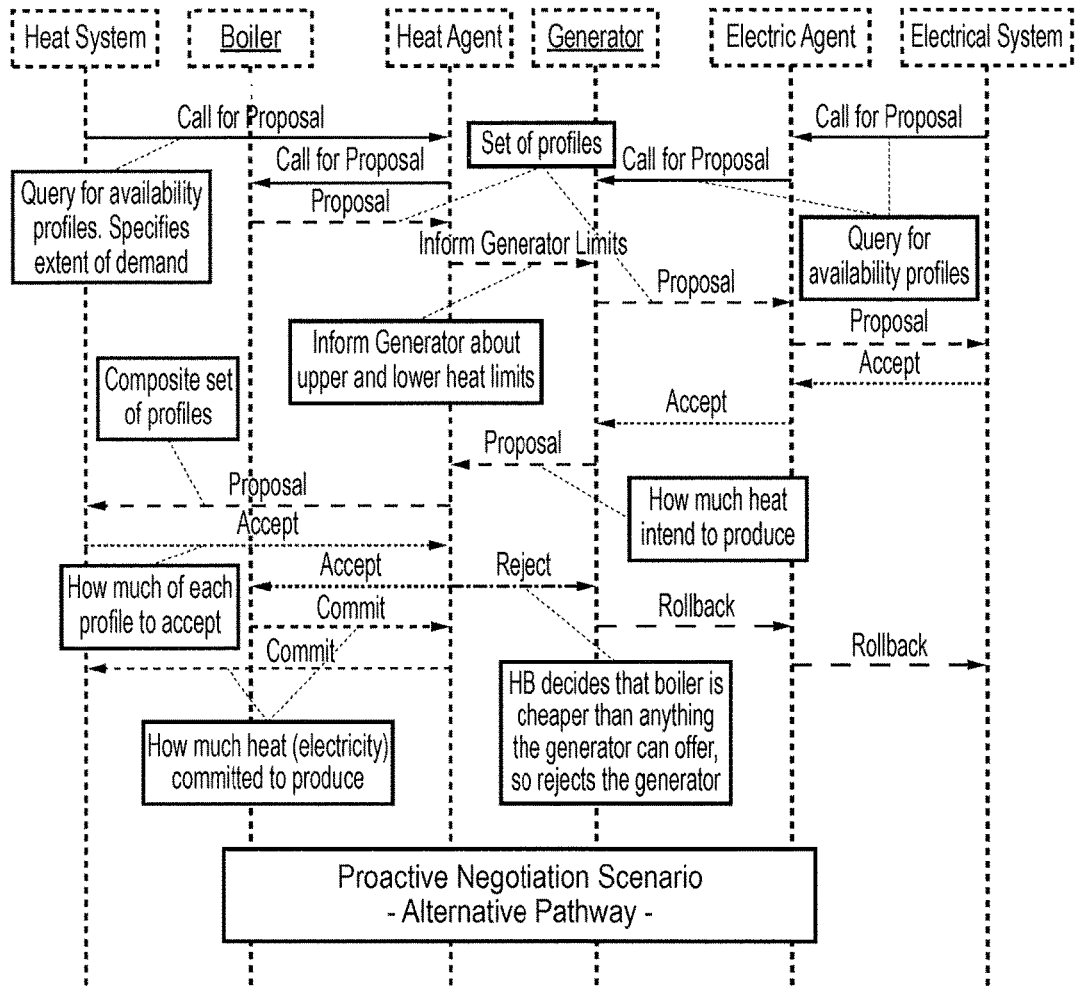
FIG. 6 shows an alternative resolution to the energy requirement scenario of FIG. 5.

FIG. 6 shows an alternative pathway to conclusion of the same scenario as FIG. 5. The conversations are initiated in the same way as in FIG. 5. However the heat agent accepts the boiler proposal instead of the proposal for delivery of excess heat generated by electrical generator. In this regard the heat agent may have a model of energy efficiency and/or cost by which to compare proposals. The heat agent thus decides that the boiler is the most efficient heat generator to satisfy the heat demands (i.e. the accepted heat proposal) for the heat system. Thus the generator transmits a Rollback message to the electrical agent, which in turn submits a corresponding Rollback message to the electrical system. In this way, the electrical energy profile for the specific electrical energy generator shown in FIG. 6 remains unchanged for the specified time period but the heat energy profile (i.e. the heat generated by the boiler and consumed by the heat system) is successfully modified. However it will be understood that the Electricity Agent is also in communicative contact with other Generators (as shown in FIG. 1 and FIG. 2) and is able to negotiate supply from them in place of the rolled-back profile that was proposed by the specific generator shown in FIG. 6.

Figure 7:
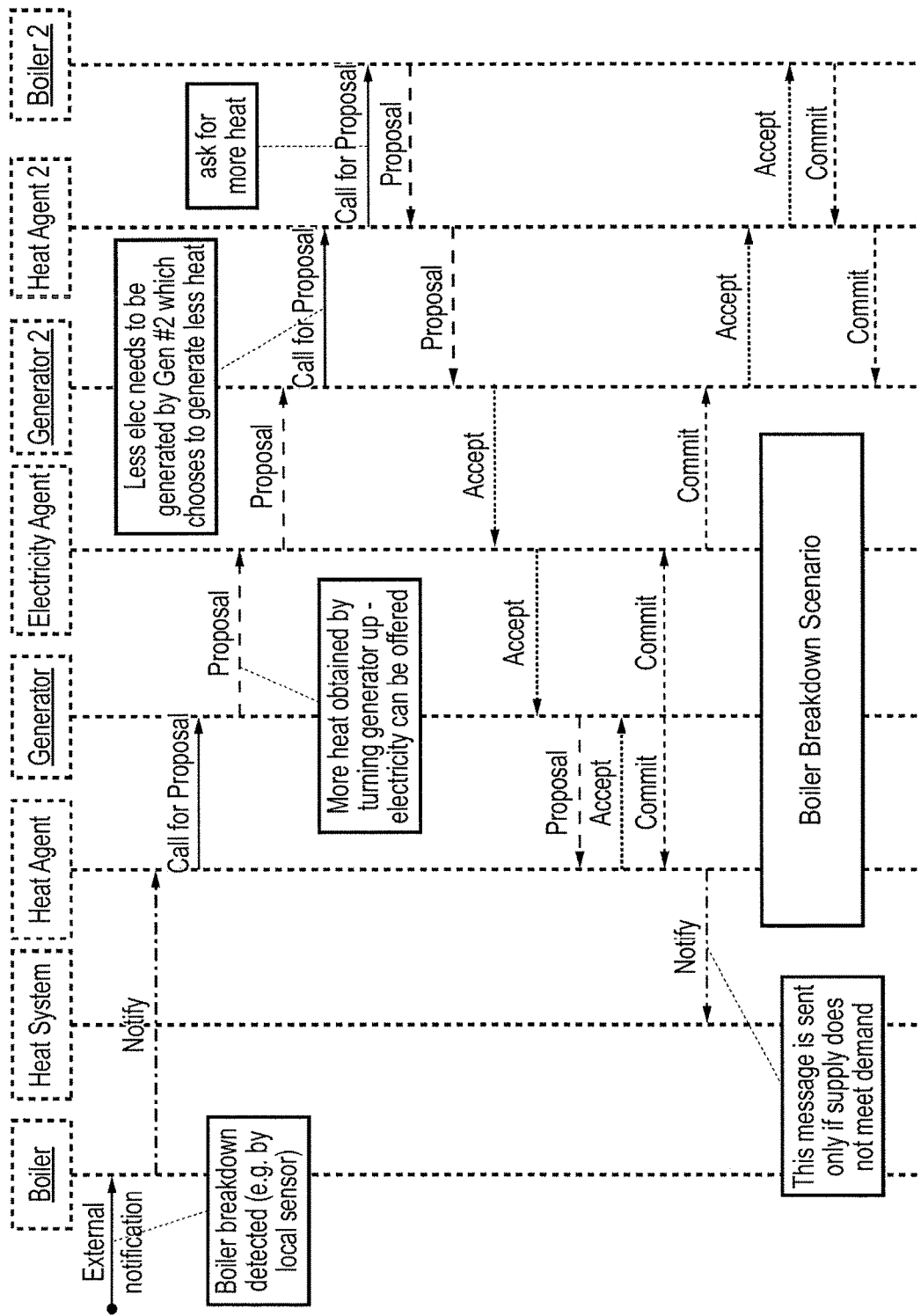
FIG. 7 shows an example of an abnormal energy supply scenario in which the invention can be used to resolve the energy distribution requirements for the local network.
Figure 8:
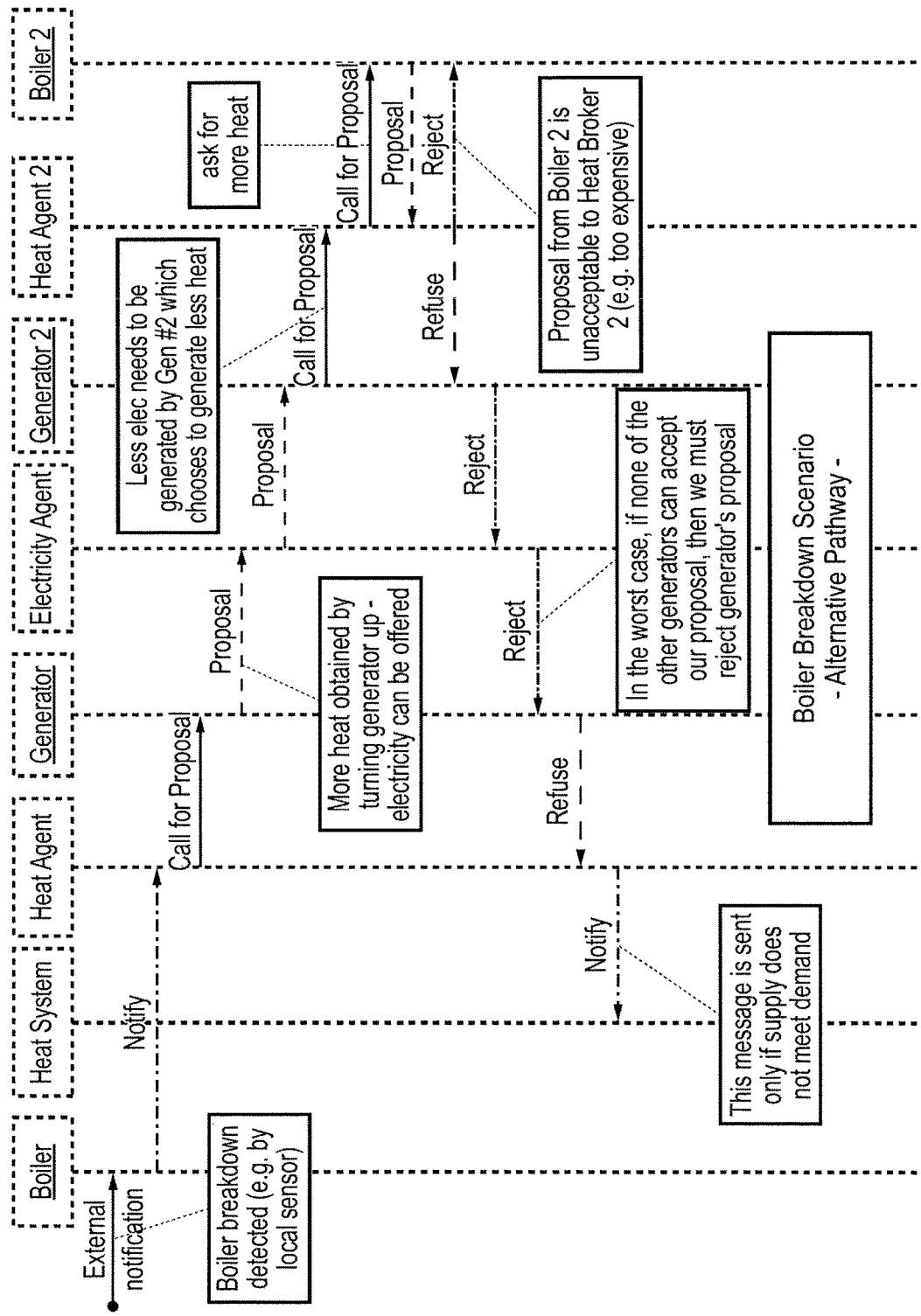
FIG. 8 shows an alternative resolution to the scenario of FIG. 7.

FIGS. 7 and 8 show two alternative pathways that may be followed for a local network in which there are a plurality of boilers and electricity generators, in the event of an unexpected boiler breakdown. In FIG. 7, it can be seen that the agent communication system resolves the issue automatically by increasing the electrical output on one generator, thereby generating more heat, decreasing the electrical output of generator 2, i.e. to prevent excess electricity generation, and increasing the heat output on the remaining boiler (Boiler 2) to maintain the required supply of heat to the Heat System for which Heat Agent 2 is acting, and decreasing the electrical output of generator 2, i.e. to prevent excess electricity generation. Thus the boiler breakdown scenario is resolved, for a specified time period, allowing repair, replacement of the boiler whilst it is offline.

FIG. 8 shows one alternative, in which the boiler breakdown cannot be automatically accommodated by the specific agents shown in the figure, and Heat Agent 2 rejects the Proposal by Boiler 2. Note that other Heat Agents (not shown in FIG. 8) may nonetheless be able to accommodate the required changes. It will be appreciated therefore that the two scenarios shown in FIG. 7 and FIG. 8, and indeed many other scenarios, may proceed in parallel. In any aspects of the invention, proposal acceptance and/or rejection criteria by the agent may comprise any or any combination of: maximum and/or minimum thresholds of energy consumption (for example max/min energy profiles over the specified time period or static max/min values); an energy efficiency threshold; and/or an energy cost threshold (for example if energy needs to be bought in from a wider network or else requires consumption of additional resources locally).

Figure 9:
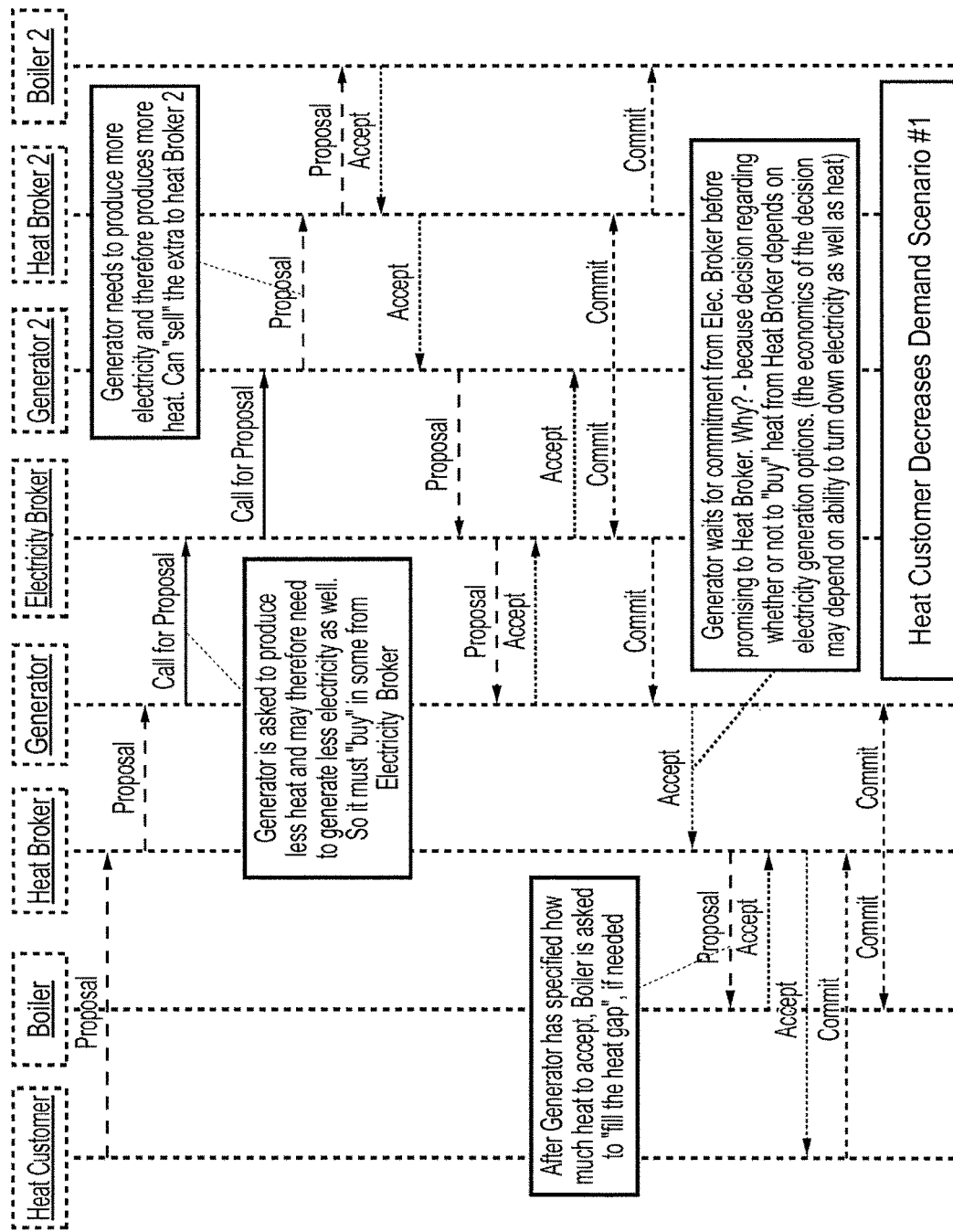
FIG. 9 shows an example of a reduction in heating requirements by a heated system being accommodated by the invention across the local energy network; and, FIG. 10 shows an example interaction between two simultaneous data conversations that intersect at a common agent.

FIG. 9 shows an alternative example, in which the communication system is used to facilitate a reduction in heat consumption, for example in response to a reduced heating demand in a heating system within the micro-grid.

In examples of the invention, the agent-based system described herein allows iterations of the communication sequences according to the above described protocols in the event of a negative outcome of the agent communications. This allows multiple renegotiations to be attempted to explore possible resolutions to changing circumstances in an automated fashion. In the event that no acceptable resolution is achieved (i.e. without commitment to a satisfactory energy profile for the relevant systems/generators over the specified time period), any agent may output an alert or message to one or more user indicative of the unresolved issue or unfavourable operation of the system. Even if a satisfactory resolution is found, an output of the changes away from a normal or optimal mode of operation may be communicated to the user. Additionally or alternatively, an agent for which a satisfactory supply has not been negotiated for a particular time period may choose to adapt its energy supply requirements and seek additional energy supply in alternative time-periods. It will be appreciated that such an approach is particularly suited to the time-shifting of heat energy requirements in response to a shortfall.

Figure 10:
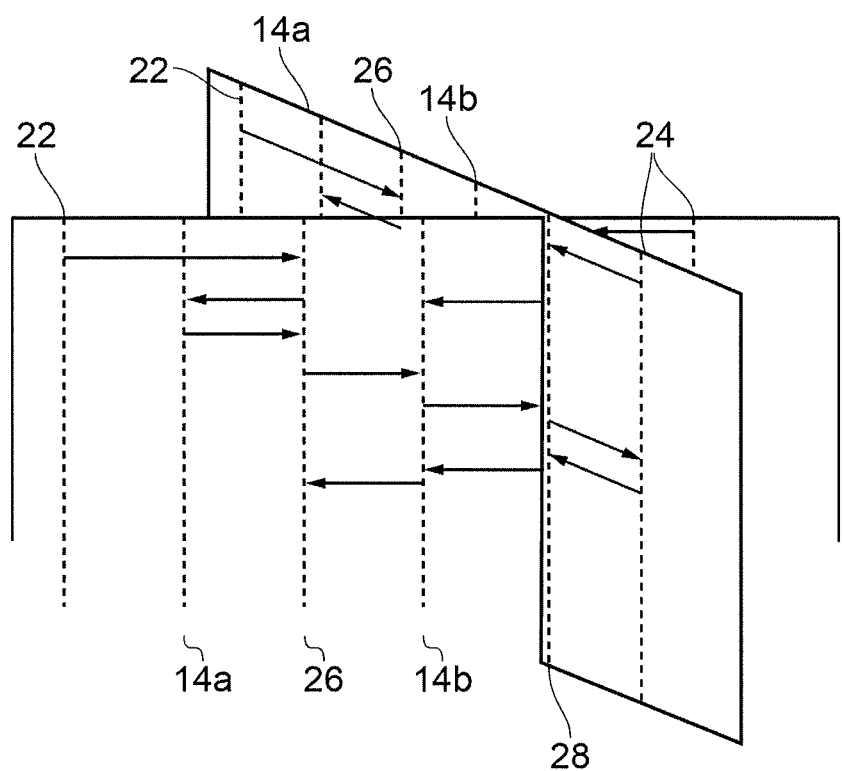

FIG. 10 provides an example of intersecting streams of negotiation. In the example shown the streams of negotiation are represented as planes and the intersection takes place at the Electricity Agent 28. This scenario corresponds to the example of FIG. 5 in which proactive negotiation of energy supply is taking place. The intersection arises because the electricity agent is common to both streams of negotiation and must coordinate the various electrical generators, for example to provide the most cost-effective distribution of load between them.

FIG. 5 also provides an example of use of the blocking parameter described above to ensure that an energy profile is not agreed until all relevant streams of negotiation are concluded. Upon receiving the Call for Proposal in FIG. 5, the Heat Agent 26 creates a first conversation record to manage/track the conversation with the Heat System 22. The Heat Agent 26 cannot respond to the Heat System 22 until it has established what heat supply it can expect from its supply chain (comprising Generator 14b and Boiler 14a). Heat Agent 26 therefore initiates a second conversation with Boiler 14a and issues a Call for Proposal to that boiler. At this point it specifies that the first conversation is blocked by the second conversation such that the next communication in the first conversation (issuing a proposal to the Heat System 22) is inhibited until a proposal from Boiler 14a is received by Heat Agent 26 in the second conversation.

In this particular example a third conversation is also initiated with Generator 14*b*. In the third conversation, Generator 14*b* cannot be informed of suitable limits until Heat Agent 26 knows what the boiler can offer. So at this point the third conversation is also blocked by the second conversation. Furthermore, the first conversation is also blocked by the third conversation before its proposal can be made to Heat System 22.

Once Boiler 14*a* responds to Heat Agent 26 with its proposal in the second conversation, the corresponding blocks on the first and third conversation are removed. The first conversation is subsequently unblocked as the third conversation progresses.

The blocking arrangement also helps to ensure that information received as part of one conversation is copied into the memory space of a conversation record that will need that information to perform its next task. For example, a blocked conversation may automatically receive copies of the data (e.g. proposal) from a blocking conversation which it needs to formulate its own proposal or otherwise perform its next step in the communication protocol.

The invention is particularly beneficial in that it can take account of part-load efficiency characteristics for individual generators, and provides an effective mechanism for managing fluctuations over time in 1) local customer demand, 2) the ratio between heat demand and electricity demand, 3) generator or boiler availability, and 4) the market price and availability of grid electricity. One particular challenge accommodated by the invention is that electricity can be distributed geographically but is not easily stored, so as to be distributed temporally, whilst heat supply is not amenable to transport over large distances but does not need to be balanced against demand on a moment-by-moment basis. A key feature of this invention is the use of negotiation protocols defining sequences of interactions between different negotiating parties, so as to solve different aspects of the wider problem in a collaborative and/or competitive fashion. This negotiation-based approach enables a system which is able to handle continuously changing customer demands, in a context where both the available resources and also the price of electricity bought from the grid may change significantly over time.

The invention can also bring about energy efficiency savings by more effective use of locally generated energy, thereby avoiding electrical transmission and distribution costs as well as by coordinating a number of generators/ boilers to achieve an optimal division of load. The invention can also bring about opportunities to sell waste heat from generators due to geographical proximity to heat demands.

This invention is particularly suited to the provision of heat and electrical power within a micro-grid in which each customer has distinct heat and electrical power requirements which vary over time over a variety of timescales.

As well as the scenarios described above, the invention is also well-suited to use with vehicles, including aircraft and vessels, for which the vehicle may only be connected to a mains supply of energy for a limited/variable period of time between journeys, such that the energy distributed can adapt to transient conditions.

Whilst the above examples relate to positive heating of systems within the network it is to be noted that the invention may additionally or alternatively accommodate negative heating (i.e. cooling) of systems in operation. Thus if systems (such as machines or engines) require coolant supply and heat dissipation for correct operation, the rate at which heat can be dissipated or transferred away from such systems, or the availability of coolant for provision to the system, may be communicated as a system constraint or demand within the framework described above. Such an embodiment may be particularly beneficial in the management of energy requirements for a combustion engine or generator.

The invention claimed is:

1. Apparatus for coordinating energy distribution over a local energy network having at least one generator and a plurality of systems requiring an energy supply for operation, each system in the local network being connected to the at least one generator and/or another system in the network for distribution of energy there-between, the apparatus comprising:
   an agent for each respective one of the generator and systems, the agent having a data store, a data processor and a data transmitter and receiver for transmission and receipt of data communication with one or more of the other agents,
   wherein the data processor of each agent is programmed to recognise a predetermined communication sequence with another agent, where the communication sequence comprises a plurality of communications with the another agent in a plurality of ordered data communication steps required to initiate supply of energy between the generator or system of said agent and the generator or system associated with the another agent, each communication sequence being assigned a future time period for which the energy supply is to be enacted, and wherein the data processor of each agent is programmed to initiate supply of energy between the generator or system of said agent and the generator or system associated with the another agent based on the predetermined communication sequence.

2. Apparatus according to claim 1, wherein one or more system agent is arranged to monitor the energy consumption of its system, said agent comprising machine readable code for determining by the processor an energy requirement of its system for a future time period.

3. Apparatus according to claim 1, wherein the predetermined communication sequence is initiated by an energy demand or quota signal for a future time period.

4. Apparatus according to claim 1, wherein an agent receiving a data communication adhering to the predetermined communication sequence is arranged to initiate a further communication sequence with one or more further generator or system agent in respect of the same future time period.

5. Apparatus according to claim 4, wherein initiation of a communication sequence with a first agent triggers further communication sequences between all of the agents of systems in the local energy network affected by the change in energy supply for said future time period.

6. Apparatus according to claim 1, wherein any, any combination, or all, of the agent communication steps in the predetermined sequence are automated by each agent in response to a triggering, or subsequent, data communication within the sequence.

7. Apparatus according to claim 1, wherein data communications between agents stemming from a common initiating communication define a tiered hierarchy of agents and/or conversations relating to a proposed energy supply change for a future time period, wherein completion of a communication sequence in one tier requires completion of a subordinate communication sequence in the, or each, lower tier in the hierarchy.

8. Apparatus according to claim 7, wherein each communicating agent is assigned to a tier in the hierarchy and communicates with an agent in a different tier to its own tier.

9. Apparatus according to claim 1, wherein each communication between the agents in relation to the same time period is assigned one of said plurality of data communication steps and a conversation status of the, or each, communication sequence is logged in the data store according to the last transmitted/received data communication in said sequence.

10. Apparatus according to claim 1, wherein each agent processor is programmed upon receipt of a data communication relating to a future time period to access the corresponding conversation status in the data store and determine if said received data communication represents a next communication in the predetermined communication sequence.

11. Apparatus according to claim 1, wherein one or more agent is arranged to conduct a plurality of concurrent conversations relating to a common future time period and wherein the agent processor is arranged to inhibit transmission of a data communication for one conversation in dependence upon a status of one or more further conversation in respect of said common future time period.

12. Apparatus according to claim 1, wherein each agent is arranged to schedule the resulting energy supply or consumption for the future time period upon completion of the predetermined communication sequence by instructing adjustment of one or more system or generator setting.

13. Apparatus according to claim 1, wherein the energy delivered to the systems under the control of the agents comprises at least electrical and heat energy.

14. Apparatus according to claim 1, wherein the predetermined communication sequence comprises at least three or four ordered data communication steps and each agent is arranged for one or a plurality of communication steps in the sequence to identify a positive or negative data communication for the purpose of progressing to the next step of the sequence, wherein only one positive and one negative communication type for each said communication step is identifiable to the agent data processor.

15. Apparatus according to claim 1, wherein an agent is arranged to inhibit progress of a conversation to a next step of the data communication sequence upon identification of a sequence blocking parameter, for example relating to a further conversation comprising one or more further agent in relation to a common energy demand or time period.

16. Apparatus according to claim 1 arranged to coordinate delivery of a plurality of energy forms over the local network and wherein the each agent is arranged to transmit/receive data communication specific to only one form of energy.

17. Apparatus according to claim 1, wherein one of the predetermined data communication steps comprises an energy proposal comprising a demand for, a change to or limit of energy generation or consumption over the allotted time period.

18. Apparatus according to claim 1, wherein at least one of the predetermined data communication steps comprises an energy profile over the predetermined future time period.

19. A local energy network comprising apparatus according to claim 1.

20. A method of energy distribution over a local energy network comprising at least one generator and a plurality of systems requiring an energy supply for operation, each system in the local network being connected to the at least one generator and/or another system in the network for distribution of energy there-between, the method comprising:
providing an agent for each respective one of the generator and systems, the agent having a data store, a data processor and a data transmitter and receiver for transmission and receipt of data communication with one or more of the other agents,
operating each agent to recognise a predetermined communication sequence with another agent, where the communication sequence comprises a plurality of communications with the another agent in a plurality of ordered data communication steps required to initiate supply of energy to/from the generator or system associated with the another agent in the local energy network, each communication sequence being assigned a future time period for which the energy supply is to be enacted, and
initiating supply of energy to/from the generator or system associated with the another agent in the local energy network based on the predetermined communication sequence.

* * * * *